United States Patent [19]

Deaver

[11] Patent Number: 4,469,366
[45] Date of Patent: Sep. 4, 1984

[54] LOUVER CONSTRUCTION

[75] Inventor: Dann T. Deaver, Harper Woods, Mich.

[73] Assignee: Ventre Corporation, Mt. Clemens, Mich.

[21] Appl. No.: 419,083

[22] Filed: Sep. 16, 1982

[51] Int. Cl.³ .................................................. B60J 3/00
[52] U.S. Cl. ....................................... 296/97 A; 52/473
[58] Field of Search ............. 296/97 A, 97 R; 52/473; 49/62, 63, 64

[56] References Cited

U.S. PATENT DOCUMENTS

| | | | |
|---|---|---|---|
| 4,006,933 | 2/1977 | Simpson | 52/473 |
| 4,081,937 | 4/1978 | Koch | 296/97 A |
| 4,121,869 | 10/1978 | Hablitzel et al. | 296/97 R |
| 4,368,605 | 1/1983 | Ulrich | 52/473 |

FOREIGN PATENT DOCUMENTS 2407456 8/1975 Fed. Rep. of Germany .

Primary Examiner—Robert R. Song
Attorney, Agent, or Firm—Harness, Dickey & Pierce

[57] ABSTRACT

A louver assembly adapted to be mounted to the rear window assembly of an automotive vehicle, having an end cap construction and a plurality of elongated channel members, the end cap construction having a plurality of identical right hand end caps and a plurality of similar but reverse formed left hand end caps, a pair of side rails to receive the end caps, a detent structure for locating and securing the channel members in alignment with the associated one of the end caps, the channel member being of a preselected length to connect right hand and left hand end caps in a predetermined spaced relationship whereby the louver assembly will be of the desired width to fit the rear window assembly, the side rails being of a preselected length to accept a selected number of associated end caps whereby the louver assembly will be of the desired length to fit the rear window assembly, an adjustable hinge assembly to permit pivotal movement of the louver assembly relative to the window assembly and being adjustable to vary the height of the louver assembly and the fore and aft position of the louver assembly relative to the window assembly, and a latch structure to inhibit tampering with the louver assembly.

20 Claims, 12 Drawing Figures

LOUVER CONSTRUCTION

BACKGROUND AND SUMMARY OF THE INVENTION

The present invention relates to a louvre construction for the rear window of an automobile.

It is common in automobile designs to provide a substantially large rear window area. Such a rear window area permits heat build up in the vehicle which can be objectionable especially during the warm seasons. Louver structures have been used on rear windows to minimize such heat build up and in fact have been and are being used for the latter reason as well as other reasons including greater privacy, rear passenger comfort (again from the sun), etc.

The present invention is an improved rear window louver construction which can be readily removed for cleaning of the rear window or for storage during colder weather. The improved rear window louver permits the continued use of rear window windshield wipers.

The louvre of the present invention is a simple construction which lends itself to easy assembly and also to provide compact "knock down" packaging.

The louvre design of the present invention has significant versatility and can with slight modification accommodate the different shapes of various rear windows. In fact in one embodiment the louvre design of the present invention can be used on rear windows of the wrap-around type.

It is an object of the present invention to provide a louver construction for the rear window of an automobile which permits use of rear window windshield wipers.

It is another object of the present invention to provide a louver construction which is readily removable from the rear window.

It is still another object of the present invention to provide a louvre of a simple construction which lends itself to easy assembly and to compact "knock down" packaging.

It is another object of the present invention to provide a louver design which can be readily adapted to rear windows of varying shapes and contours.

It is a general object of the present invention to provide an improved louvre construction for rear windows of automobiles.

Other objects, features and advantages of the present invention will become apparent from the subsequent description and the appended claims, taken in conjunction with the accompanying drawings, in which:

DESCRIPTION OF THE PREFERRED EMBODIMENT

Figure 1:
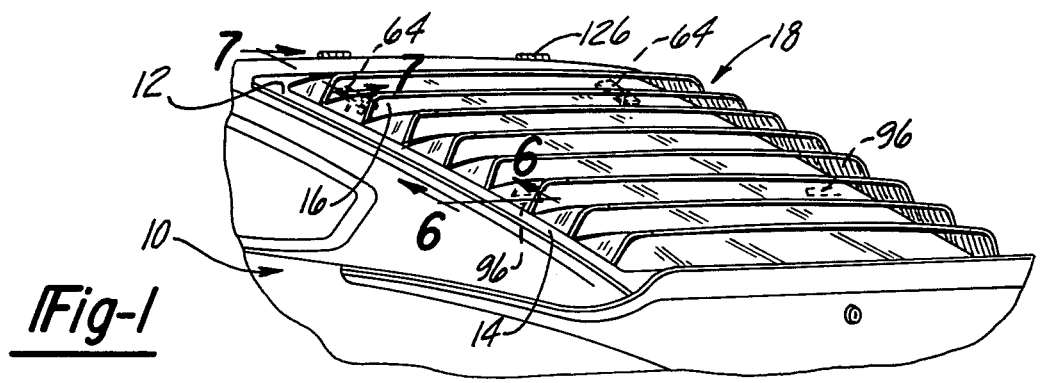
FIG. 1 is a fragmentary pictorial view of the rear portion of an automobile including the rear window area and further including a louver assembly of the present invention.

Looking now to FIG. 1 the rear portion of a vehicle 10 (only partially shown) includes a rear window assembly 12. The rear window assembly 12 includes a peripheral molding 14 and window 16. The window 16 is shown shaded for purposes of clarity; assembly 12 includes the necessary seals and associated support structure the details of some of which have been omitted for simplicity.

A louvre assembly 18, embodying features of the present invention, is shown mounted to the rear window assembly 12. An exploded view of the louvre assembly 18 can be seen in FIG. 2 and includes a pair of identical longitudinal side rails 20 and 22 with rail 20 adapted to receive a plurality of identical left hand end caps 24 and with rail 22 adapted to receive a plurality of identical right hand end caps 26. Pairs of end caps made up of opposite ones of end caps 24 and 26 are connected via elongated louvre channels 28.

Figure 2:
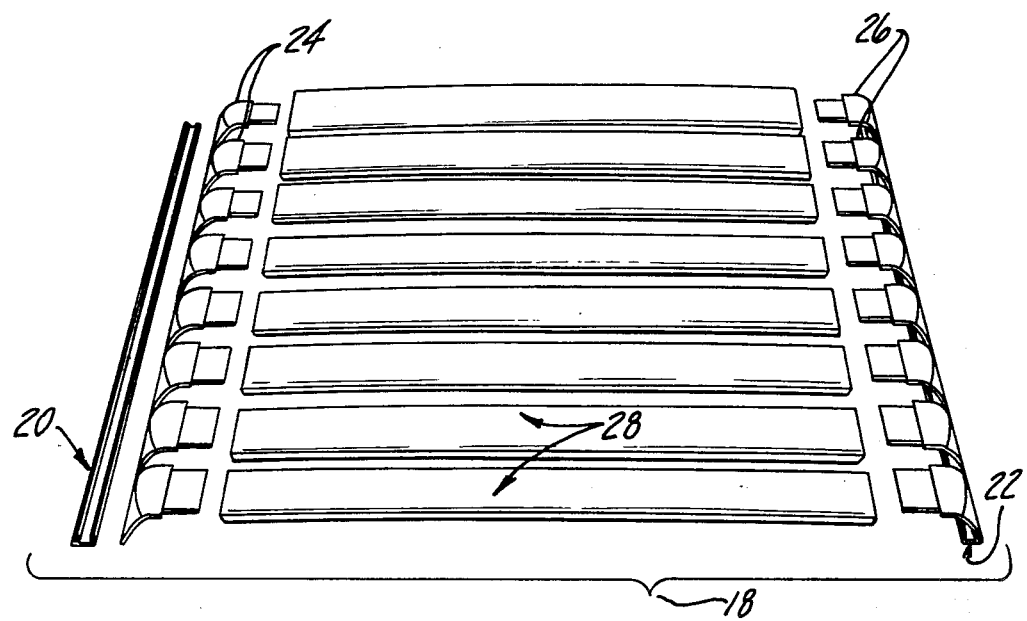
FIG. 2 is a perspective, partially exploded view of various components such as end caps, side rails and louvre channels, of the louver assembly of FIG. 1.
Figure 3:
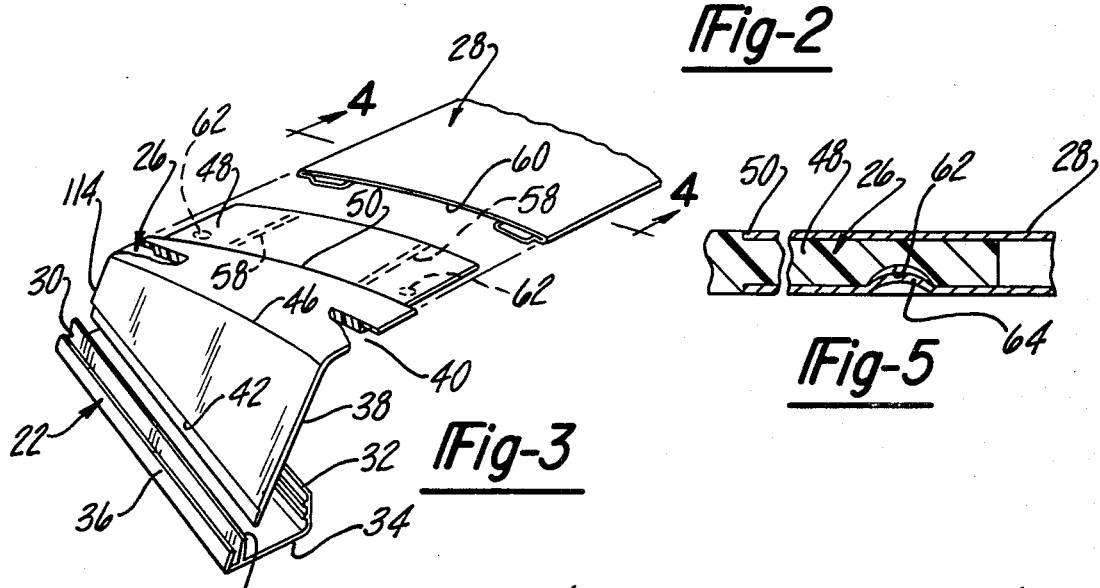
FIG. 3 is a pictorial view, to enlarged scale, depicting the preassembled relationship of an end cap and associated side rail and louvre channel of FIG. 2.
Figure 5:
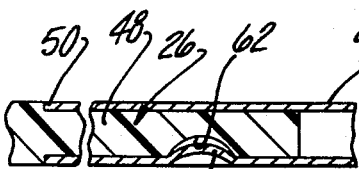
FIG. 5 is a sectional view to enlarged scale of the louver channel and end cap of FIG. 3 generally taken along the lines 5—5 when assembled.

Looking now to FIGS. 2 and 3, the side rail 22 is of a generally U-channel configuration which can be of an extruded aluminum construction. Side rail 22 includes a longitudinally extending, outer retaining groove 30 which defines an outer leg of the U-channel and is inwardly angulated to receive and to locate end caps 26 in the desired position. A longitudinally ribbed flange 32 also extends longitudinally and defines an inner leg of the U-channel. A strip of felt 34 or other soft non-abrasive material is fixed to the bottom of rail 22. Since the rail 22 (and assciated rail 20) is adapted to rest against the glass window 16, the strip 34 is provided to prevent scratching and reduce noise from vibration. Note that the outer leg 36 of the retaining groove is of a preselected height such that when the rail 22 is located on the window 16 it is generally concealed by the trim molding 14.

The end caps 26 provide a means of interconnecting the louver channels 28 and associated side rail 22 and are contoured such as to orient the louver channels 28 generally horizontally. The horizontal orientation of louvre channels 28 is provided to permit good rear vision for the vehicle driver, i.e. through the spaces between adjacent louver channels 28. Thus end caps are generally L-shaped having a pair of leg portions 38 and 40. Leg portion 38 has a longitudinally extending recessed section 42 which is of a width adapted to be received with a slight interference fit into groove 30.

In one form of the invention an inner leg 44 of groove 30 has its upper end angulated slightly towards outer leg 36 whereby the desired interference for the recessed section 42 is provided.

Also in one form of the invention the depth of the recess of section 42 is generally equal to the thickness of the outer leg 36 such that upon assembly there will be a generally continuous outer surface. Also the depth of the groove 30 is preferably slightly greater than the insertable length of the section 42 whereby engagement of the end surface of the recess of section 42 and the upper surface of leg 36 will most likely be assured to avoid gaps therebetween. At the same time this provides a means of positively and accurately locating the end caps 26 relative to the side rail 22 which can be subject to quick visual inspection.

A radiused transition portion 46 smoothly connects leg portions 38 and 40 such that it compensates for the angle of the glass 16 to locate leg portion 40 in a generally horizontal plane when the louvre assembly 18 is located upon the rear window assembly 12. Thus the result is that the leg portions 38 and 40 are not "square" or "rectangular" since opposite edges are of different widths. However, the 'horizontal' leg portion 40 terminates in an end section 48 which is generally "square" or "rectangular" and which, as will be seen, functions to connect the associated end cap 26 which a channel louvre 28. In general it can be seen that end section 48 is of a reduced width and is recessed on top to define a shoulder 50. Because of its complex shape, end caps 26 in one form of the invention are formed of a high impact thermoplastic material by injection molding.

The louvre channel 28 can be roll formed from aluminum and includes a slightly bowed center portion 52 terminating in channel portions 54 located at opposite sides. At the same time the louver channels can be formed with a sweep, i.e. a longitudinal curvature having a sweep radius R (see FIG. 2) if desired. Channel portions 54 are formed integrally with center portion 52, are relatively narrow and are adapted to receive the opposite sides of end section 48. The channel portion 54 terminates in an inwardly directed flange 56 with the flange adapted to be received in locating grooves 58 in end portion 48. With the flange 56 located in grooves 58 the louvre channel 28 will be laterally aligned and held in the desired lateral position relative to end cap 26.

When the louvre channel 28 is assembled to the end cap 26 its associated end 60 is adapted to engage the shoulder 50. The depth of shoulder 50 is approximately the same as the material thickness of the louvre channel 28 so that a smooth surface is provided at the juncture. In order to avoid separation and gaps appearing, the louvre channel 28 and end cap 26 are locked together with a detent type construction comprising molded recesses 62 in end portion 48 and indentations 64 in channel portions 54 adapted to be lockingly received in recesses 62.

In order to provide for a uniformly contoured appearance when the louvre channel 28 is assembled to the end cap 26, the ends of the opposite sides of end cap 26 are contoured for at least a portion thereof to have a stepped construction generally matching that at the opposite sides of louvre channel 28. This can be seen from the portion of end cap 26 shown broken away at FIG. 3.

In the prior description only the details of side rail 22 was described, it being understood that side rail 20 is identical thereto. Likewise only right hand end caps 26 have been described in detail it being understood that left hand end caps are left hand duplicates thereof.

The assembly of the side rails 20, 22 and end caps 24, 26 (respectively) and louvre channels 28 is quite simple and lends itself to ease of shipment and storage and for distribution in a 'kit' form.

Looking now to FIG. 2, the end caps 24 and 26 are assembled to their respective side rails 20 and 22, respectively. This is done as shown in FIG. 3, with recess section 42 located in groove 30. In order to enhance the mechanical connection a suitable adhesive is used and, in this regard, it should be noted that the volume of groove 30 is somewhat larger than that of the recess section 42. As assembled then, there would now be a pair of subassemblies with side rails 20, 22 and end caps 24, 26 and separate louvre channels 28. It can be seen that in this condition of preassembly the components can be readily packaged and stored. All that is required for final assembly is to insert the end portions (such as portion 48) of end caps 24, 26 into the ends of louvre channels 28 until detenting occurs (such as between indentation 64 and recess 62) and the louvre assembly 18 is assembled and ready for installation onto the rear window assembly 12. Again to insure a secure connection a suitable adhesive can be used between end portion 48 and the engaging portions of louvre channels 28.

Louvre assembly 18 includes a pair of hinge assemblies 64 located at the top thereof which permit the louvre assembly 18 to be pivoted away from the window assembly 12 for cleaning and/or maintenance purposes. Looking now to FIG. 7, the hinge assembly 64 includes a pair of hinge plates 66 and 68, of unequal length, which are pivotally connected together in a conventional manner with a pin construction 70. The shorter plate 66 is riveted to the bottom of the upper one of channel portions 54 of the uppermost louvre channel 28. The longer hinge plate 68 is provided with a pair of parallel slots 72 (see FIG. 8) which are adapted to receive a pair of threaded stud members 74.

Figure 7:
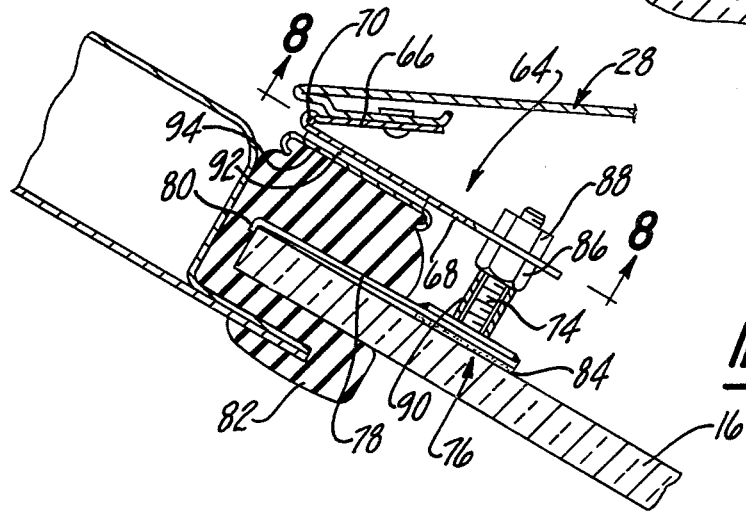
FIG. 7 is a sectional view to enlarged scale of a hinge construction of the louvre assembly of FIG. 1 generally taken along the lines 7—7.
Figure 8:
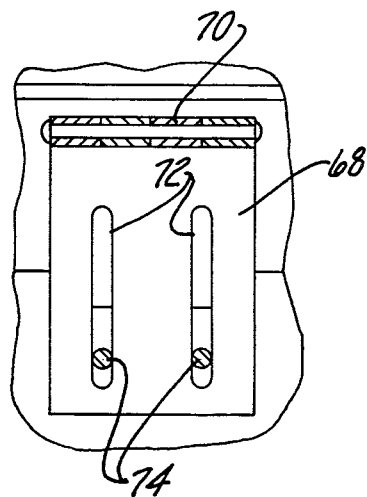
FIG. 8 is a sectional view of the hinge construction of FIG. 7 taken generally along the lines 8—8.

The studs 74 are part of a mounting plate assembly 76 and are welded or otherwise secured to a base plate 78. Base plate 78 is generally flat and terminates at its upper end in a downwardly depending lip 80. In assembly, the mounting plate 76 is located as shown in FIG. 7 with the base plate 78 located in part between a resilient window seal 82 and with the lip 80 overengaging the edge of the glass 16 or window assembly 12 to help hold it from downward movement. When the mounting plate assembly 76 is located in its appropriate position it is further secured in place by double sided pressure sensitive tape 84. With the louvre assembly 18 located in the desired position via slots 72 relative to rear window assembly 12 it will be held in place by pairs of nut members 86, 88 arranged to operate as a lock nut combination. Tubular spacers 90 are located on studs 74 to provide the desired height for the hinge plate 68. Spacers 90 can be varied in height for different applications. A strip 92 of felt or other non-abrasive material is secured to the bottom of hinge plate 68 to inhibit scratching of the surface of a cover molding 94 supported on the window seal 82.

Figure 6:
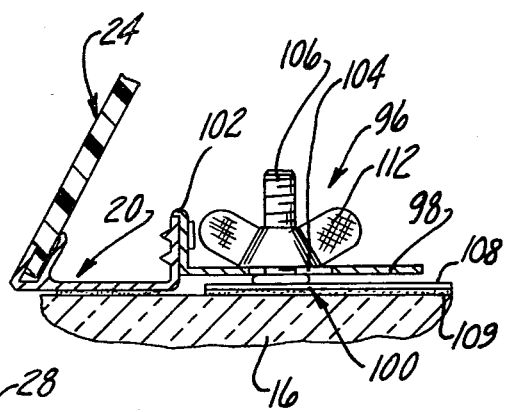
FIG. 6 is a sectional view to enlarged scale of a hold down structure of the louvre assembly of FIG. 1 generally taken along the lines 6—6.

The louvre assembly 18 is further held in place by means of a pair of tie down assemblies 96. Looking now to FIGS. 1 and 6 a pair of tie down assemblies 96 are located at opposite sides of louvre assembly 18 and include an L-shaped bracket 98 and a mounting plate assembly 100. The bracket 98 is riveted or otherwise secured to the inner leg (such as leg 32) of side rails 20 and 22 and has a locating lip 102 which cooperates to assist in location during assembly. Bracket 98 has a slot 104 adapted to receive a threaded stud 106 which is welded or otherwise secured to a base plate 108 of the mounting plate assembly 100. Once the mounting plate assembly 100 has been appropriately located on the rear window 16 it is secured in place by double sided pressure sensitive tape 109. A wing nut 112 removably holds the bracket 98 (and hence the louvre assembly 18) to the mounting plate assembly 100 (and hence to the window 16). The wing nut 112 facilitates ease of assembly and removal.

Note that the channel portions 54 extend longitudinally for the length of louvre sections 28 and provide substantial stiffness to bending and twisting whereby the need for intermediate supports along the length of the louvre channels 28 is obviated.

At the same time note that the end caps 24 and 26 are structured to locate the inner ends of the louvre channels 28 spaced a preselected distance from the rear window glass 16, i.e. by providing that the inner ends (such as 114 for end cap 26 in FIG. 3) are of a minimum distance. The provision of this minimum clearance plus the lack of need for any center support structure permits the continued use of rear windshield wipers where such are used.

Note that the components shown can be readily adapted to accommodate windows of different widths and lengths by simply varying the length of side rails 20, 22, varying the number of end caps 24, 26 and varying the length (and where needed) the angulation of the ends of louvre channels 28. Thus the present design can provide economy on production since the same basic components (with minor changes) will accommodate a large number of rear window designs.

Figure 9:
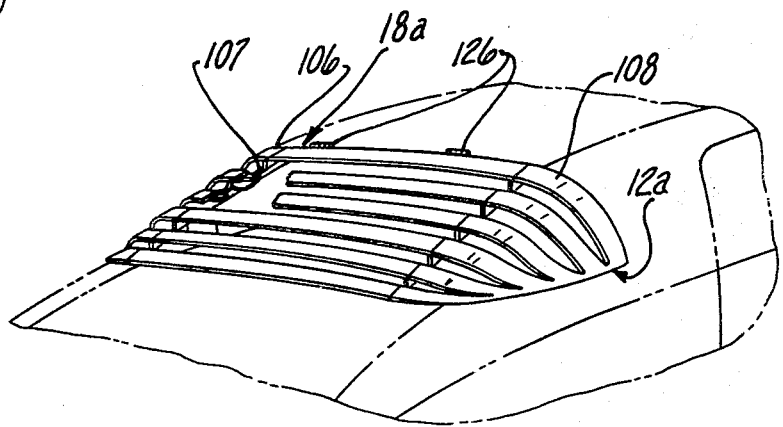
FIG. 9 is a fragmentary pictorial view of the rear portion of an automobile including the rear window area with a wrap-around window construction and further including a modified form of louvre assembly adapted for use with such wrap-around window construction.
Figure 10:
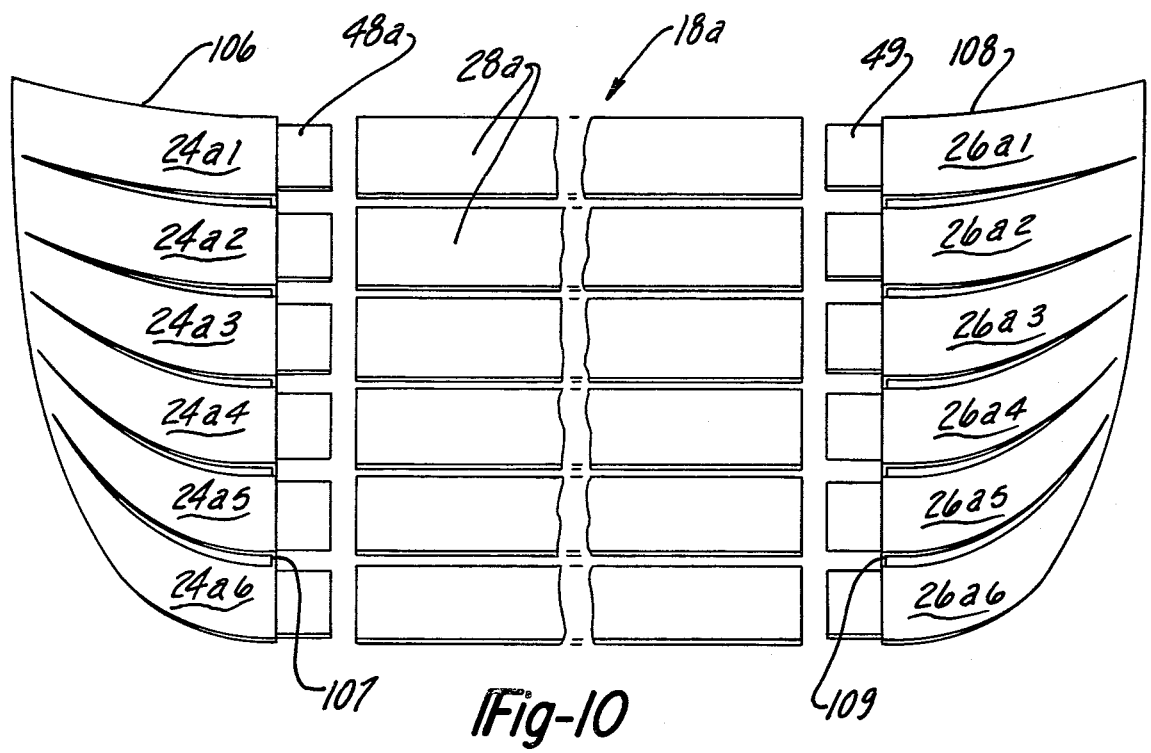
FIG. 10 is an exploded elevational view (to enlarged scale) of the louvre assembly of FIG. 9 including end caps and louvre channels.

Some vehicles employ a wrap-around rear window design. Prior constructions have used a sectioned louvre construction comprising a pair of independent side assemblies and a separate center assembly. By utilizing features of the present invention a single integral louvre assembly for a wrap-around rear window can be realized. Such a structure is shown in the embodiment of FIGS. 9-10. In that embodiment components similar to and serving similar functions to like components have been given the same numerical designation with the addition of the letter subscript "a".

Thus looking now to FIGS. 9-10, a louvre assembly 18a is shown mounted to a rear window assembly 12a. An exploded view of louvre assembly 18a is shown in FIG. 10 and includes a pair of left and right hand integral end cap units 106 and 108, respectively, which are preferably formed of a high impact thermoplastic material by injection molding. The end cap units 106, 108 include a plurality of integrally formed end cap portions 24a1-a6 and 26a1-a6, respectively. The end cap units 106 and 108 are contoured to generally match the curved contour of the wrap around portion of the window assembly 12a with which they are in confrontation. The terminal ends of each end cap portion 24a1-a6 and 26a1a6 are substantially the same as that shown for the separate end caps 24, 26 of the embodiment of FIGS. 1-5. Thus end section 48a and 49 are identical to end sections 48. The end cap units 106 and 108 are connected together by louvre channels 28a, which channels are identical to channels 28 of FIGS. 1-5. Thus the detent interconnection and other details of end sections 48 and louvre channels 28 are present in end sections 48a (49) and louvre channels 28a and hence these details have been omitted for purposes of simplicity. Laterally extending ribs 107 and 109 are located at the juncture of end sections 48 and 49, respectively. The ribs 107 and 109 are adapted to be located at the generally flat portion of the wrap around window assembly 12a and to engage the same to provide support for the louvre assembly 18a. Note that while the knock down feature of the embodiment of FIGS. 9 and 10 is still present, the design of the end cap units 106 and 108 will vary for different rear window assemblies.

Figure 11:
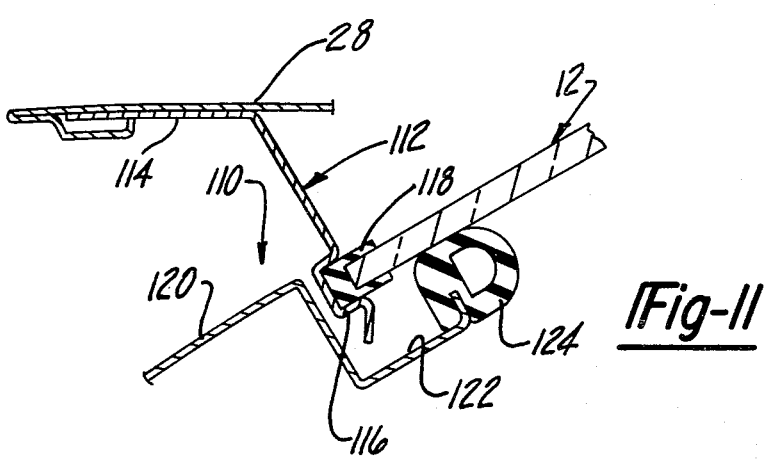
FIG. 11 is a sectional view to enlarged scale of a tamper proof lock structure for the louvre assembly of FIGS. 1-5 taken generally along the lines 11—11 of FIG. 1.

It is desirable to provide a means for locking the louvre assembly to the vehicle rear window assembly to inhibit theft. Thus in FIG. 11 a lock assembly 110 is shown. The assembly 110 includes a flexible clip 112 having one leg 114 secured to the bottom louvre channel 28. A spring clip portion 116 is adapted to overengage a trim molding 118 located at the bottom edge of the window assembly 12. A rear deck portion 120 conventionally terminates in a channel portion 122 having a seal 124 adapted to sealingly engage the window assembly 12 when it is closed. In this closed position, the flexible clip 112 has the spring clip portion 116 located within the channel or trough 122 where it is inaccessible from the outside. Thus when the window assembly 12 is closed the louver asembly 18 cannot be removed. The window assembly 12 can be pivoted upwardly (by a conventional construction) via hinges 126. The window assembly 12 is normally locked in place (by a conventional construction) via a key actuated lock assembly 128. When the lock assembly 128 is actuated and the window assembly 12 is raised (via hinges 126), the spring clip portion 116 will then be accessible and can be manipulated whereby removal of the louvre assembly by the vehicle operator can be facilitated.

Figure 4:
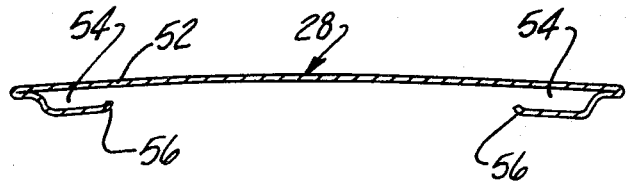
FIG. 4 is a sectional view to enlarged scale of a roll formed louvre channel taken generally along the lines 4—4 in FIG. 3.
Figure 12:
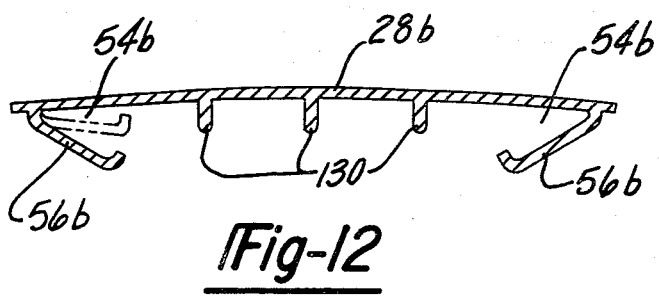
FIG. 12 is an enlarged sectional view of a partially formed louvre channel formed by extrusion.

FIG. 12 is a cross section of a louvre constructed by extrusion, preferably from aluminum. Thus in FIG. 12 components similar to like components in the embodiment of FIG. 4 are given the same numerical designation with the addition of the letter postscript 'b'. The louvre 28b is shown in an intermediate (not final) form with flanges 56b and hence channel portions 54b extruded to be open from its final position. By extruding the louvre 28b longitudinally extending stiffening ribs 130 can be provided. Subsequent to extrusion in the form shown the louvre 28b is rolled to provide the appropriate sweep, i.e. longitudinally curved contour, and at the same time the flanges 56b are closed to their final position (shown in phantom). The flanges 56b are partially opened (as shown in FIG. 12) to facilitate rolling of the desired sweep (longitudinal curvature) before the flanges 56b are closed. Note that louvre 28b in this process can be formed from a longer section of material extruded to the contour of FIG. 12 with the longer section of material being rolled to its final contour (sweep) and flanges 56b closed and subsequently cut laterally to the desired length and angulation of the ends.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A louvre assembly adapted to be mounted to the rear window assembly of an automotive vehicle, comprising an end cap construction and a plurality of elongated channel members, said end cap construction comprising a plurality of identical right hand end caps and a plurality of similar but reverse formed left hand end caps, each of said end caps being generally L-shaped in cross section and having a downwardly extending leg portion and a laterally extending leg portion, a pair of side rails one associated with said plurality of right hand end caps and the other for said plurality of left hand end caps, each side rail having a channel adapted to receive the downwardly extending leg portions of the associated ones of said right and left hand end caps, a transition portion connecting said downwardly extending leg portion and said laterally extending leg portion to locate said laterally extending leg portion generally horizontally when the louvre assembly is mounted to said rear window assembly, said laterally extending end portion having a reduced section end adapted to be matably received within the end of an associated one of said channel members, detent means located between said end section and the mating end of said channel member, said detent means positively locating said channel member in alignment with the associated one of said end caps and securing said channel member and said end cap together, said channel member being of a preselected length to connect said right hand and left hand end caps in a predetermined spaced relationship whereby the louvre assembly will be of the desired width to fit the rear window assembly, said side rails being of a preselected length to accept a selected number of associated end caps whereby the louvre assembly will be of the desired length to fit the rear window assembly.

2. The louvre assembly of claim 1 with each of said channel members having a pair of parallel, longitudinally extending flanges adapted to be received in a pair of parallel longitudinally extending grooves in said reduced section end to generally guide said reduced section end into said channel member and to generally laterally locate the two.

3. The louvre assembly of claim 1 with said downwardly extending leg portion of each said end cap being grippingly engaged by and adhesively bonded to said channel of the associated one of said side rail.

4. The louvre assembly of claim 1 with said reduced section end being adhesively bonded to said mating surface of said channel member.

5. The louvre assembly of claim 1 including a hinge assembly located at the upper end of the louvre assembly for permitting pivotal movement of the louvre assembly relative to the window assembly, said hinge assembly comprising height adjustment means connected to the rear window assembly and the louvre assembly for selectively adjusting the height of the louvre assembly relative to the window assembly.

6. The louvre assembly of claim 5 including a pair of tie down means connected between opposite sides of the louvre assembly and the window assembly for removably holding the louvre assembly to the window assembly.

7. The louvre assembly of claim 1 with said channel of each of said side rails having an outer leg member, each of said downwardly extending leg portions being notched across its outer face at its lower extremity to define a mating surface for engaging said outer leg member of said channel with minimal outer surface discontinuity.

8. The louvre assembly of claim 7 with the notches portion of said downwardly extending leg portions being less in vertical length than the depth of said channel to locate said end caps in a predetermined position when said mating surface engages said outer leg member.

9. The louvre assembly of claim 6 with the window assembly being hinged to an associated vehicle body for pivotal movement to open and closed positions, releasable latch means connected to the window assembly and to the louvre assembly for releasably connecting the louvre assembly to the window assembly and being accessible for release with the window assembly in said open position and inaccessible for release in said closed position.

10. The louvre assembly of claim 5 with said hinge assembly including pin and slot means for permitting adjustment of the louver assembly forwardly and rearwardly relative to the rear window assembly.

11. A knock down louvre assembly adapted to be mounted to the rear window assembly of an automotive vehicle, comprising an end cap construction and a plurality of elongated channel members, said end cap construction comprising a plurality of identical right hand end caps and a plurality of similar but reverse formed left hand end caps, each of said end caps being generally L-shaped in cross section and having a downwardly extending leg portion and a laterally extending leg portion, a pair of side rails one associated with said plurality of right hand end caps and the other for said plurality of left hand end caps, each side rail having a channel adapted to receive the downwardly extending leg portions of the associated ones of said right and left hand end caps, a transition portion connecting said downwardly extending leg portion and said laterally extending leg portion to locate said laterally extending leg portion generally horizontally when the louvre assembly is mounted to said rear window assembly, said laterally extending end portion having a reduced section end adapted to be matably received within the end of an associated one of said channel members, detent means located between said end section and the mating end of said channel member, said detent means positively locating said channel member in alignment with the associated one of said end caps and securing said channel member and said end cap together whereby said end cap construction and said channel members can be stored in a non-assembled condition and readily assembled without the need of fasteners, said channel member being of a preselected length to connect said right hand and left hand end caps in a predetermined spaced relationship whereby the louvre assembly will be of the desired width to fit the rear window assembly, said side rails being of a preselected length to accept a selected number of associated end caps whereby the louvre assembly will be of the designed length to fit the rear window assembly.

12. The louvre assembly of claim 11 with said channel members being constructed of formed aluminum and with said end caps being of injection molded plastic.

13. A louvre assembly adapted to be mounted to the rear window assembly of an automotive vehicle with the rear window assembly hinged to the associated vehicle body for movement to open and closed positions, said louvre assembly comprising end cap means defining opposite sides of said louvre assembly and a plurality of elongated channel member means interconnecting said end cap means, securement means for removably securing the louvre assembly to the automotive vehicle and comprising releasable latch means connected to the window assembly and to the louver assembly for releasably connecting the louvre assembly to the window assembly and being accessible for release when the window assembly is in said open position and inaccessible for release in said closed position.

14. The louvre assembly of claim 13 including a hinge assembly located at the upper end of the louvre assembly for permitting pivotal movement of the louvre assembly relative to the window assembly, said hinge assembly comprising height adjustment means connected to the rear window assembly and the louvre assembly for selectively adjusting the height of the louvre assembly relative to the window assembly.

15. The louvre assembly of claim 13 with said securement means including a hinge assembly located at the upper end of the louvre assembly for permitting pivotal movement of the louvre assembly relative to the window assembly, said hinge assembly including pin and slot means for permitting adjustment of the louvre assembly forwardly and rearwardly relative to the rear window assembly.

16. The louvre assembly of claim 14 with said securement means comprising removable tie down means located at opposite sides of the louver assembly for holding the louvre assembly to the window assembly.

17. A louvre assembly adapted to be mounted to the rear window assembly of an automotive vehicle, comprising an end cap means defining opposite sides of the louvre assembly and a plurality of elongated channel member means interconnecting said end cap means, hinge assembly means located at the upper end of the louvre assembly for permitting pivotal movement of the louvre assembly relative to the window assembly, said hinge assembly including adjustment means for permitting adjustment of the louvre assembly forwardly and rearwardly relative to the rear window assembly.

18. A louvre assembly adapted to be mounted to the rear window assembly of an automotive vehicle with the rear window assembly having a wrap around window curvature at opposite side portions connected by a relatively flat contoured portion, comprising an end cap construction and a plurality of elongated channel members, said end cap construction comprising a right hand end cap and a similar but reverse formed left hand end cap, each of said end caps being curved generally to follow the curved shape of the opposite side portions, each of said end caps including a plurality of vertically separated louvre portions curved to the contour of the confronting side portions of the rear window assembly, each of said louvre portions terminating in a reduced section portion adapted to be matably located within one end of said channel members whereby said channel members connect said right and left end caps together, said channel members being of a length to locate said right and left hand end caps at the side portions of the window assembly.

19. The louvre assembly of claim 18 with said right and left hand end caps each having a transversely extending support rib located at the juncture of said reduced section portions and the associated portion of said louvre portions, said support rib being located at the flat contoured portion of the rear window assembly and contoured to engage the window assembly to support the louvre assembly.

20. A louvre assembly adapted to be mounted to the rear window assembly of an automotive vehicle, comprising an end cap construction and a plurality of elongated channel members having a longitudinally extending sweep radius, said end cap construction comprising a plurality of right hand end cap portions and a plurality of similar but reverse formed left hand end cap portions, each said end cap portions having a reduced end section adapted to be matably received within the end of an associated one of said channel members, said channel means being of an extruded aluminum construction extruded to a generally straight contour and having an upper portion terminating in a pair of lower end flanges with said end flanges being extruded in a generally open position, and being rolled to said sweep radius with said flanges in said open position whereby formation of the sweep radius is facilitated, said flanges being closed after formation of said sweep radius.

* * * * *

UNITED STATES PATENT AND TRADEMARK OFFICE
CERTIFICATE OF CORRECTION

PATENT NO. : 4,469,366

DATED : September 4, 1984

INVENTOR(S) : Dann T. Deaver

It is certified that error appears in the above-identified patent and that said Letters Patent is hereby corrected as shown below:

Column 4, line 54, delete "or" and substitute therefor --of--.
Column 5, line 67, delete "26a1a6" and substitute therefor --26a1-a6--.
Claim 8, line 4, delete "notches" and substitute therefor --notched--.

Signed and Sealed this

Twenty-second Day of January 1985

[SEAL]

Attest:

DONALD J. QUIGG

*Attesting Officer*   *Acting Commissioner of Patents and Trademarks*